(12) United States Patent
Ilg

(10) Patent No.: US 6,512,307 B1
(45) Date of Patent: Jan. 28, 2003

(54) MOTOR VEHICLE DATA TRANSMISSION SYSTEM AND DATA TRANSMISSION METHOD

(75) Inventor: Johannes Ilg, Regensburg (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/535,540

(22) Filed: Mar. 27, 2000

(30) Foreign Application Priority Data

Mar. 26, 1999 (DE) .......................................... 199 13 919

(51) Int. Cl.[7] ................................................. B60L 1/00
(52) U.S. Cl. ................... 307/9.1; 307/10.1; 340/310.01
(58) Field of Search ................................. 307/9.1, 10.1; 340/310.01

(56) References Cited

U.S. PATENT DOCUMENTS 5,998,884 A * 12/1999 Kitamine et al. .......... 307/10.1
6,127,939 A * 10/2000 Lesesky et al. ........ 340/825.06

FOREIGN PATENT DOCUMENTS

DE        197 33 866 A1     2/1999

OTHER PUBLICATIONS

Schöttle et al., "Future Power Supply Systems for Cars," VDI Berichte No. 1287 (1996), pp. 295–317.

* cited by examiner

Primary Examiner—Brian Sircus
Assistant Examiner—Robert L. DeBeradinis
(74) Attorney, Agent, or Firm—Morgan, Lewis & Bockius, LLP

(57) ABSTRACT

A communication system for a motor vehicle including a first voltage supply line, a second voltage supply line, a first electronic apparatus, and a second electronic apparatus. The first electronic apparatus is connected to the first and second voltage supply lines and transmits data over the first and second voltage supply lines. The second electronic apparatus is also connected to the first and second voltage supply lines and receives data over the first and second voltage supply lines.

20 Claims, 1 Drawing Sheet

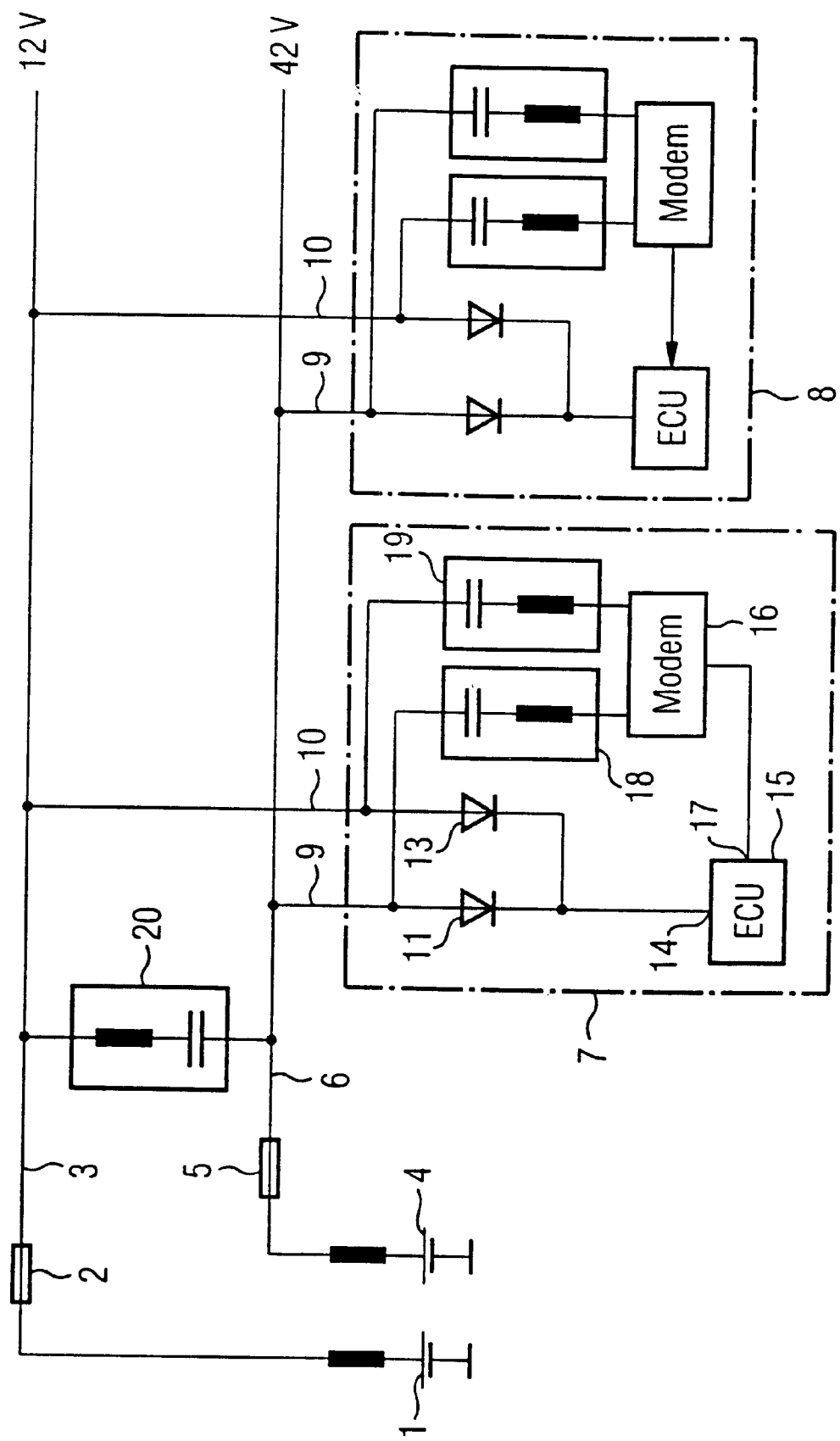

MOTOR VEHICLE DATA TRANSMISSION SYSTEM AND DATA TRANSMISSION METHOD

CROSS-REFERENCE TO RELATED APPLICATIONS

This application claims the benefit of priority of German Patent Application No. 19913919.9, filed on Mar. 26, 1999, which is incorporated by reference herein in its entirety.

BACKGROUND OF THE INVENTION

The present invention relates to a data transmission system in a motor vehicle that is equipped with batteries generating two different voltages (e.g., 12 V and 42 V), and hence with two on-board power supply networks.

An example of such an on-board power supply network architecture is described in VDI Berichte No. 1287 (1996), pages 295 to 317.

Conventionally, a data connection is necessary between functionally cooperating on-board apparatuses, such as between control apparatuses or between a control apparatus and corresponding sensors and/or actuators (e.g., immobilizer control systems and corresponding components, entry control systems, passenger protection systems, and the like). The data connection is usually achieved through a data bus connected to the on-board apparatuses.

German Patent No. 197 33 866 discloses a data transmission method. A satellite station is supplied with energy from a central station through a common transmission line for data transmission and power supply. For the transmission of energy and data, however, only one line is used (the data transmission line). Such a data transmission method is very sensitive to error.

SUMMARY OF THE INVENTION

The present invention addresses the problem of creating a communication system that will permit reliable data communication even if errors occur.

The present invention provides a data communication system for a vehicle. The system comprises a first voltage supply line at a first voltage relative to ground; a second voltage supply line at a second voltage relative to ground; a first electronic apparatus connected to the first and second voltage supply lines; and a second electronic apparatus connected to the first and second voltage supply lines. The first electronic apparatus is adapted to transmit a first set of the data over the first and second voltage supply lines, and the second electronic apparatus adapted to receive the first set of data over the first and second voltage supply lines.

The present invention further provides a method of communicating data for a vehicle. The vehicle has a first battery supplying a first voltage to a first on-board power supply network and a second battery supplying a second voltage to a second on board power supply network. The first voltage nominally is greater than the second voltage. The method comprises connecting a first electronic apparatus to the first and second on-board power supply networks; connecting a second electronic apparatus to the first and second on-board power supply networks; transmitting the data from the first electronic apparatus over the first and second on-board power supply networks; and receiving the data at the second electronic apparatus from the first and second on-board power supply networks.

In a motor vehicle communication system according to the present invention, transmitted data is carried in parallel through two sets of voltage supply lines (one for each of the batteries). Consequently, the advantages of the present invention include eliminating a separate data bus and providing a redundant design, i.e., reliable data communication is sustained through one of the voltage supply lines if the other voltage supply line fails due to a defect or short circuit, for example.

Frequency filters (e.g., high-pass filters or preferably band-pass filters tuned to the data transmission frequencies) are provided for coupling and decoupling the data to and from the voltage supply lines, and for isolating the data from the direct current carried by the voltage supply lines. Thus, a sufficiently great signal-to-noise ratio is assured, as well as good isolation from the direct current.

Data can be transmitted directly to the voltage supply lines as a series of bits. Alternatively, each communication apparatus can be equipped with a modulator sending signals and with a demodulator for receiving signals. Of course, the modulator and demodulator can be combined to form a modem. However, a communication apparatus that is designed only for sending or receiving signals, a modulator or demodulator, respectively, is sufficient for such apparatus. Thus, data can be converted to or from a disturbance-free transmittable frequency range. The modems can be of conventional design, such as those used in analog telephony.

During the sending procedure, modulated data to be transmitted can be put into both voltage supply lines simultaneously. However, in the reception procedure, a receiver input can be connected selectively by a switch to only one voltage supply line so as to avoid interference between modulation signals that are shifted out of phase between the two voltage supply lines, but are otherwise identical. For example, if the receiver recognizes that no data is being delivered, the switch can then select the other voltage supply line. The switch can also be operated cyclically or non-cyclically in order to determine which voltage supply line can provide a better signal.

At least one line coupler can be provided between the two voltage supply lines. For example, the line coupler can be a band-pass filter tuned to the data transmission frequencies or modulation signal frequencies. This assures that data or modulation signals transmitted on the one voltage supply line are also conducted by the other voltage supply line, even though the apparatus is directly transmitting data on only one voltage supply line, either by choice or due to interference.

The current for operating the connected electronic apparatus can be provided from either or both voltage supply lines through a common connection to the input of the electronic apparatus. To separation different potentials between the voltage supply lines, decoupling devices (e.g., diodes), can be used. If one voltage supply line is not operational due to a short circuit or other defect, power can be supplied to the electronic apparatus from the other of the two voltage supply lines, thereby assuring that the required direct current remains unvaried. Thus, interference, losses, interruptions, short circuits, and other factors disturbing a voltage supply line do not impair the functionality of the connected electronic apparatus, since their power supply and data communications (sending and/or receiving of data as well as internal data processing) and other ways of operation are sustained to the full extent by the other voltage supply line.

The data transmission method of the invention is likewise characterized by the advantages and operating features explained above.

BRIEF DESCRIPTION OF THE DRAWINGS

The accompanying drawing, which is incorporated herein and constitutes part of this specification, illustrates an embodiment of the invention, and, together with the general description given above and the detailed description given below, serve to explain features of the invention.

The drawing FIGURE is a block diagram of a communication system according to the present invention.

DETAILED DESCRIPTION OF THE PREFERRED EMBODIMENTS

Referring to the drawing FIGURE, a communication system 100 is shown. The communication system 100 is equipped as a two-battery, on-board network with a first battery 1 connected to a voltage supply line 3 through a fuse 2, and a second battery 4 connected to a voltage supply line 6 through a fuse 5. The batteries 1,4 can produce different voltages. For example, the battery 1 can produce a voltage supply of 12 V measured against ground potential, and the battery 4 can produce a higher voltage supply of 42V measured against ground potential.

Connected to the two voltage supply lines 3,6 are electronic apparatuses 7 and 8 which communicate data to one another and/or to additional electronic apparatuses (not shown) that are similarly connected to the voltage supply lines 3,6. The electronic apparatuses can be of various kinds, e.g., for controlling electric steering, transmission, or brake systems, passenger protection system, immobilizing functions, or the like). The electronic apparatuses can also be configured for sending or receiving data only, as can be the case with sensors or actuators.

In the embodiment shown in the drawing FIGURE, each electronic apparatuses 7,8 is wired in the same manner and connected by conductors 9 and 10 to the voltage supply lines 6,3, respectively.

The construction and arrangement of electronic apparatus 7 will now be explained. In the present embodiment, the electronic apparatus 8 is of the same design as the electronic apparatus 7, even though each electronic apparatus controls a different function. Therefore, a separate description of electronic apparatus 8 is unnecessary.

The conductors 9,10 are isolated from one another by diodes 11 and 13, respectively, and are connected to a voltage supply input 14 of an electronic control unit 15. The electronic control unit 15 performs the control and processing functions for the electronic apparatus. The electronic control unit 15 is equipped internally with a voltage regulator (not shown) which is connected to the voltage supply input 14 that, regardless of the level of the connected input voltage (e.g., 12 V or 42 V), produces a regulated voltage supply (e.g., +5 V) to supply to the electronic control unit 15 and/or other components present in the electronic apparatus. The voltage regulator can be a separate component that is independent of the electronic control unit 15.

As long as the voltage supply line 6 is intact, the higher voltage of (e.g., 42 V) is applied to the voltage supply input 14 the electronic control unit 15. If the voltage on voltage supply line 6 collapses (for example, due to a defect, short circuit or failure of the battery 4), power will still be supplied to the voltage supply input 14 by the voltage supply line 3, so that the electronic apparatus continues to operate correctly.

The electronic apparatuses is further equipped with a modem (i.e., a modulator/demodulator) 16 which is connected with a data connection (data input and/or data output) 17 of the electronic control unit 15. The modem 16 can be similar to those used in analog telephony.

The modem 16 is selectively connected via two separate parallel coupling circuits 18 and 19 to the conductors 9,10, respectively, and thus to voltage supply lines 6,3, respectively. The parallel coupling circuits 18,19 can be band-pass filters which pass the frequencies of the modulated data signal that is produced or received by modem 16, but block higher and lower frequencies down to the direct current. The parallel coupling circuits 18,19 are connected to separate terminals of the modem 16 to which identical modulation signals are output when the electronic control unit 15 is transmitting data. Upon receiving data, modulated input signals are simultaneously present in the parallel coupling circuits 18,19 and at the separate terminals of the modem 16. The modem 16 can combine the two modulated input signals additively before demodulation. Alternatively, an internal changeover switch (not shown) can be provided, so that in each case only one of the received modulated input signals (e.g., the stronger modulated signal) is processed and delivered to the demodulator section of the modem 16. By cyclic or acyclic operation of the internal changeover switch it is possible, for example, to determine the better modulated input signal (i.e., stronger, more free of interference, etc.), by comparing amplitudes. The internal changeover switch can then select the better modulated input signal.

If, for example, the electronic apparatus 7 is attempting to transmit to the electronic apparatus 8, or to another electronic apparatus (not shown), the control unit 15 of the electronic apparatus 7 outputs a data signal to its modem 16. The modem 16 converts the data signal to a modulated signal, for example (e.g., a high-frequency signal). The modulated signal is transmitted/remodulated through the two band-pass filters 18,19, the conductors 9,10, and the voltage supply lines 6,3. Thus each of the components or electronic apparatuses 7,8 connected to the voltage supply lines 3,6 can receive the modulated signal. The modulated signal can be provided with an address field which represents the address of the electronic apparatus that is intended to receive the modulated signal. The modulated signal can also provide an address of the sending electronic apparatus.

When the modulated data signal is received by the electronic apparatus 8, its electronic control unit 15 recognizes its own address at its data input 17 connected with its modem 16, and therefore accepts the modulated signal for evaluation. The modem 16 of apparatus 8 receives the modulated signal through band-pass filters 18,19, which are connected by its conductors 9,10 to the voltage supply lines 6,3. The modulated signal is demodulated by the modem 16 of the electronic apparatus 8 and the control unit of the electronic apparatus 8 can then process the data signal.

If, for example, the electronic apparatus 8 is attempting to transmit data to the electronic apparatus 7, the electronic apparatus 8 can transmit a data signal with the receiver address representing the electronic apparatus 7. The data signal is transmitted through the modem 16, the band-pass filters 18,19, and the voltage supply lines 3,6 to the electronic apparatus 7.

As shown in the drawing, a line coupler 20 is connected between the voltage supply lines 3,6. The line coupler 20 can be a band-pass filter tuned to the same frequency range as the band-pass filters 18,19. The line coupler 20 produces a data coupling of the voltage supply lines 3,6 while maintaining isolation from the direct current. The line coupler 20 assures that data signals (modulated if desired) transmitted on one of the voltage supply lines will also be induced on and transmitted by the other voltage supply line. Even if a connection between the electronic apparatus and one of the voltage supply lines is interrupted (e.g., due to faulty contact, etc.), and thus the faulty voltage supply line can not transmit the data signal, the line coupler 20 assures that the data signal is transmitted through the other voltage supply line. The line coupler 20 is shown disposed near the fuses 2,5. The line coupler 20 can be located between the fuses 2,5 and the electronic apparatuses 7,8 so as to form a data loop circuit.

The band-pass filters 18,19 and the line coupler 20 provide sufficiently strong attenuation in frequency ranges not used for the transmission of data and modulation signals. This aids in the isolation of these signals from the direct current of the batteries 1,4, and achieves a good signal-to-noise ratio during operation.

If an electronic apparatus connected to the voltage supply lines 3,6 only transmits or receives signals, the electronic apparatus can be equipped with only a modulator or demodulator, respectively, in place of the modem 16. Otherwise the basic construction of the electronic apparatuses 7,8 can be used in the construction of other electronic apparatuses.

The design shown can also be used for the transmission of video and audio signals, which then constitute the data to be sent.

The present invention is characterized by high reliability of operation and minimal additional wiring costs since separate data transmission lines are not provided. This also results in weight and cost savings and reduces the amount of wiring.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. A data communication system for a vehicle, the system comprising:
   a first voltage supply line at a first voltage relative to ground;
   a second voltage supply line at a second voltage relative to ground;
   a first electronic apparatus connected to each of the first and second voltage supply lines, the first electronic apparatus adapted to transmit a first set of the data over each of the first and second voltage supply lines; and
   a second electronic apparatus connected to each of the first and second voltage supply lines, the second electronic apparatus adapted to receive the first set of data over each of the first and second voltage supply lines.

2. The system according to claim 1, wherein the first voltage nominally is greater than the second voltage.

3. The system according to claim 1, further comprising:
   a first voltage source providing the first voltage on the first voltage supply line; and
   a second voltage source providing the second voltage on the second voltage supply line.

4. The system according to claim 1, further comprising:
   a first filter connecting the first electronic apparatus to the first voltage supply line;
   a second filter connecting the first electronic apparatus to the second voltage supply line;
   a third filter connecting the second electronic apparatus to the first voltage supply line; and
   a fourth filter connecting the second electronic apparatus to the second voltage supply line.

5. The system according to claim 4, wherein each of the first, second, third, and fourth filters are selected from a group consisting of a frequency filter and a band-pass filter.

6. The system according to claim 1, wherein the first electronic apparatus includes a modulator adapted to transmit the first set of the data, and the second electronic apparatus includes a demodulator adapted to receive the first set of the data.

7. The system according to claim 6, wherein the demodulator includes a switch selectively coupling the demodulator to one of the first and second voltage supply lines.

8. The system according to claim 1, wherein the first electronic apparatus includes a first modem adapted to transmit the first set of the data and adapted to receive a second set of the data, and the second electronic apparatus includes a second modem adapted to receive the first set of the data and adapted to transmit the second set of the data.

9. The system according to claim 8, wherein the first modem includes a first switch adapted for receiving the second set of the data selectively from one of the first and second voltage supply lines, and the second modem includes a second switch adapted for receiving the first set of the data selectively from one of the first and second voltage supply lines.

10. The system according to claim 1, further comprising:
    a line coupler connecting the first and second voltage supply lines, the line coupler preventing transmission of the first and second voltages between the first and second voltage supply lines and permitting transmission of the first set of the data between the first and second voltage supply lines.

11. The system according to claim 1, wherein the first electronic apparatus includes a first voltage supply input connected to each of the first and second voltage supply lines, and the second electronic appartus includes a second voltage supply input connected to each of the first and second voltage supply lines.

12. The system according to claim 11, further comprising:
    a first decoupler between the first voltage supply line and the first voltage supply input;
    a second decoupler between the second voltage supply line and the first voltage supply input;
    a third decoupler between the first voltage supply line and the second voltage supply input; and
    a fourth decoupler between the second voltage supply line and the second voltage supply input.

13. The system according to claim 12, wherein each of the first, second, third, and fourth filters include a diode preventing transmission of the first and second voltages between the first and second voltage supply lines.

14. The system according to claim 11, wherein the first electronic apparatus includes a first voltage regulator connected to the first voltage supply input and the second electronic apparatus includes a second voltage regulator connected to the second voltage supply input, the first voltage regulator providing a generally constant first operating voltage to the first electronic apparatus and the second voltage regulator providing a generally constant second operating voltage to the second electronic apparatus.

15. The system according to claim 1, further comprising:
a first voltage source providing the first voltage on the first voltage supply line;
a second voltage source providing the second voltage on the second voltage supply line, the second voltage nominally is less than the first voltage;
a first frequency filter connecting the first electronic apparatus to the first voltage supply line;
a second frequency filter connecting the first electronic apparatus to the second voltage supply line;
a third frequency filter connecting the second electronic apparatus to the first voltage supply line;
a fourth frequency filter connecting the second electronic apparatus to the second voltage supply line;
a line coupler connecting the first and second voltage supply lines, the line coupler preventing transmission of the first and second voltages between the first and second voltage supply lines and permitting transmission of the first set of the data between the first and second voltage supply lines;
a first diode between the first voltage supply line and the first voltage supply input, the first diode preventing transmission of the second voltage to the first voltage supply input;
a second diode between the second voltage supply line and the first voltage supply input, the second diode preventing transmission of the first voltage to the first voltage supply input;
a third diode between the first voltage supply line and the second voltage supply input, the third diode preventing transmission of the second voltage to the second voltage supply input;
a fourth diode between the second voltage supply line and the second voltage supply input, the fourth diode preventing transmission of the first voltage to the second voltage supply input;
a first voltage regulator connecting the first and second voltage supply lines to the first electronic apparatus and providing a generally constant first operating voltage; and
a second voltage regulator connecting the first and second voltage supply lines to the second electronic apparatus and providing a generally constant second operating voltage.

16. A method of communicating data for a vehicle, the vehicle having a first battery supplying a first voltage to a first on-board power supply network and having a second battery supplying a second voltage to a second on board power supply network, the first voltage nominally being greater than the second voltage, the method comprising:
connecting a first electronic apparatus to each of the first and second on-board power supply networks;
connecting a second electronic apparatus to each of the first and second on-board power supply networks;
transmitting the data from the first electronic apparatus over each of the first and second on-board power supply networks; and
receiving the data at the second electronic apparatus from each of the first and second on-board power supply networks.

17. The method according to claim 16, further comprising:
supplying a first operating voltage to the first electronic apparatus from the first and second on-board power supply networks; and
supplying a second operating voltage to the second electronic apparatus from the first and second on-board power supply networks.

18. The method according to claim 16, wherein the receiving the data includes switching between the first and second on-board power supply networks.

19. The method according to claim 16, further comprising:
coupling the first and second on-board power supply networks, the coupling preventing transmission of the first and second voltages between the first and second on-board power supply networks and permitting transmission of the data between the on-board power supply networks.

20. The method according to claim 16, further comprising:
regulating operating voltages of the first and second electronic apparatuses.

\* \* \* \* \*